United States Patent Office 2,841,956
Patented July 8, 1958

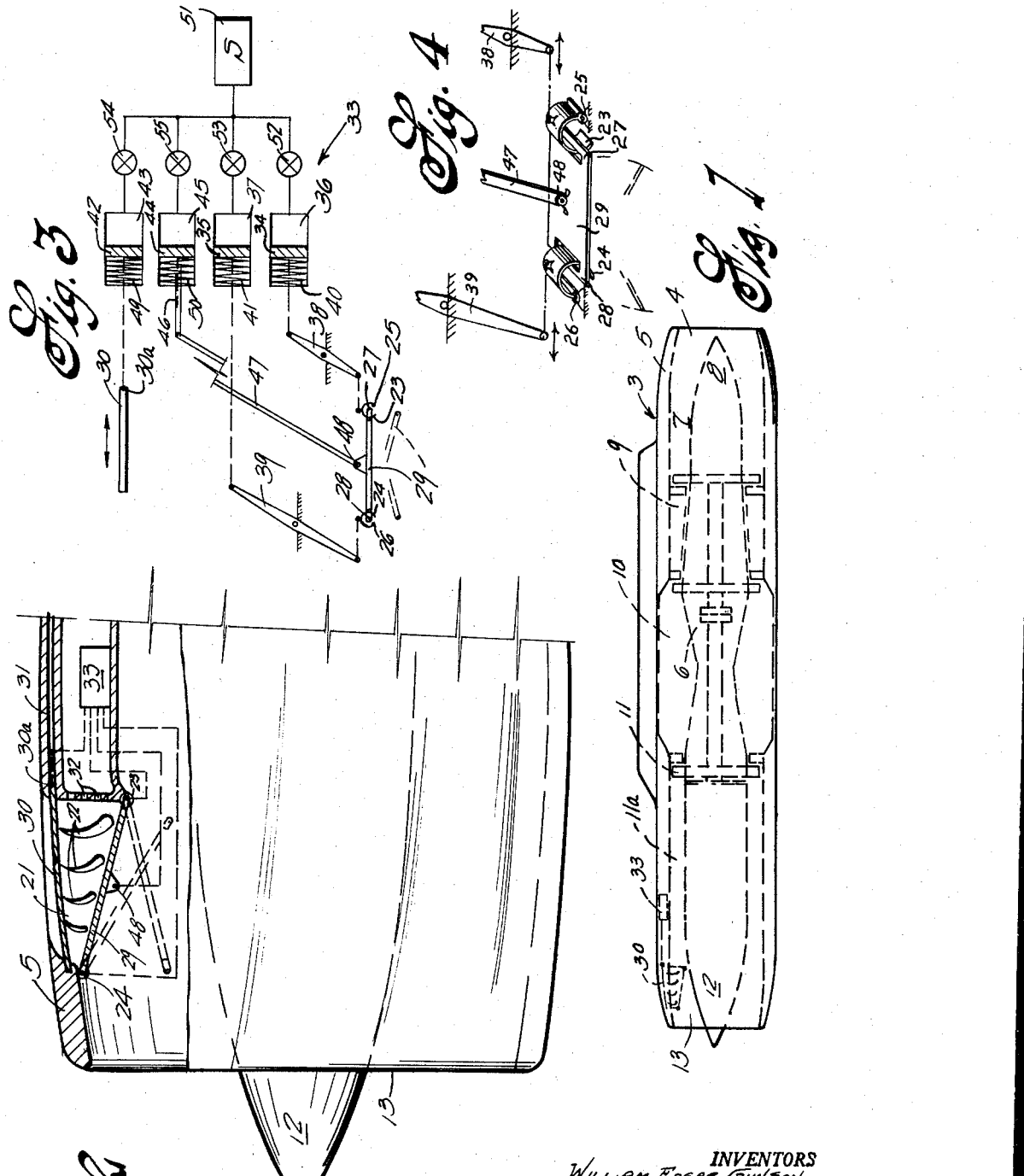

2,841,956

COMBINATION VARIABLE AREA CONVERGING-DIVERGING NOZZLE AND THRUST DESTROYER

William E. Gunson, Kansas City, Mo., and Elton F. Hammond, Jr., Roeland Park, Kans., assignors, by mesne assignments, to the United States of America as represented by the Secretary of the Navy Application February 20, 1956, Serial No. 566,741

4 Claims. (Cl. 60—35.54)

The present invention relates to gas turbine engines for use on jet propelled aircraft and more particularly to novel and improved turbo-jet apparatus whereby the effective exhaust nozzle area of the same may be conveniently varied and controlled and whereby a controlled amount of the thrust energy discharged from the turbine may at times be neutralized and/or used to develop a substantial reverse thrust.

In landing high-speed jet-propelled aircraft, it often becomes necessary and desirable to provide a simple and effective means for retarding forward motion of the same, thus enabling the aircraft to come to a safe sure stop within a reasonable landing distance. One particular yet frequent situation where aircraft having limited landing distance characteristics becomes necessary occurs where the aircraft must land upon the limited deck area of an aircraft carrier. Although it is well known that aircraft may be provided with types of braking devices and other arrangements to retard forward motion, there is still much room for improvements in such devices particularly where such apparatus can at the same time provide variable control of the effective exhaust nozzle area of the jet engine during various flight conditions.

It is a principal object of the present invention to provide novel and improved thrust retarding apparatus for jet propelled aircraft.

It is a further object of the present invention to provide apparatus in jet-propelled aircraft for diverting controlled amounts of its motive exhaust gases toward the direction of forward motion of the aircraft and at the same time for varying and controlling the effective area of its exhaust nozzle.

Other objects and many of the attendant advantages of this invention will be readily appreciated as the same becomes better understood by reference to the following detailed description when considered in connection with the accompanying drawing wherein:

Figure 1 is a side elevational view of a jet propulsion power plant in which the apparatus of the present invention may readily be incorporated.

Figure 2 is an enlarged vertical sectional view of the after end of the power plant shown in Figure 1.

Figure 3 is a diagrammatic view of a preferred embodiment of the inner flap control apparatus shown in Figures 1 and 2.

Figure 4 is an enlarged side elevation of the specific inner flap apparatus shown in Figure 3.

A preferred embodiment of the present invention is illustrated in Figure 1 of the drawing. As shown therein, the power plant 3 which may be mounted in or upon the fuselage or wings or the aircraft with its air intake section 4 oriented in the direction of flight preferably comprises the outer shell or casing structure 5 which together with the inner core structure 6 provides an annular air duct 7 that extends through the casing structure fore and aft with respect to the aircraft. The core structure is coaxial with and supported within the casing structure and comprises a nose portion 8, an axial-flow compressor unit 9, combustion apparatus 10, a turbine 11, an afterburner section 11a, and a tailpiece 12 which together with the rear of the casing 5 defines the propulsion or discharge nozzle 13.

In operation air enters the intake 4, and flows through the compressor 9, and into the combustion apparatus 10 which may be of any suitable construction to add heat to the compressed air supplied by the compressor. The hot motive gases which leave the combustion apparatus are then directed by suitable stationary guides vanes against the moving blades of the turbine rotor 11. The residual energy of the motive gases are then reburned in the afterburner section 11a and discharged through the nozzle 13 of the power plant to propel or aid in propulsion of the aircraft.

As indicated heretofore during landing operations of the aircraft, it often becomes necessary and desirable to reduce the forward thrust produced by the power plant. Moreover, it often becomes necessary and desirable to improve the efficiency and effectiveness of the power plant during various conditions of flight by varying and controlling the effective area of the exhaust nozzle of the power plant. The apparatus for doing this in accordance with the present invention is illustrated in detail in Figure 2 of the drawing. As shown therein, the opening 21 is provided in the shell or casing 5 of the power plant and the exhaust gas deflector vanes or the like 22 are securely positioned therein in any suitable conventional manner. The crescent-shaped hook members 23 and 24 are pivotably secured as shown at 25 and 26 on the casing 5 and as will be more apparent hereinafter are arranged to engage the post members 27 and 28 which form an integral part of the control flap member 29. As will also be more apparent hereinafter, the outer flap member or the like 30 is arranged for slideable adjustment in the slot 31 between the casing 5 and the perforated vertically disposed wall structure 32 to control the effective size of the opening 21 during the thrust destroying operation.

Control of the disposition of the inner and outer flap members 29 and 30 is maintained by the apparatus generally designated by reference numerals 33. Accordingly, as shown in greater detail in Figure 3 of the drawing, the pistons 34 and 35 in cylinders 36 and 37 are respectively coupled to the hook members 23 and 24 through the connecting rod and linkage systems 38 and 39. The spring members 40 and 41 respectively bias the hook members 23 and 24 toward normal door post encircling on opposite extremities of the inner flap member 29. The piston 42 in cylinder 43 is coupled to the inner extremity 30a of the outer flap member 30 and piston 44 in cylinder 45 is coupled through its connecting rod 46 and lever 47 to the eye 48 on the inner flap member 29. Spring members 49 and 50 respectively bias the pistons 42 and 44 toward their closed positions within their respective cylinders 43 and 45. As will be more apparent hereinafter, movement of the pistons 34, 35, 42 and 44 within their respective cylinders is induced and controlled by the pressurized fluid source or the like 51 respectively through the control valves 52, 53, 54 and 55.

In operation when the aircraft approaches for a landing or when it is desired to diminish the forward thrust of the aircraft for any reason during any other maneuver, the pilot opens valve 52 which actuates piston 34 against the bias of spring 40 and rotates the hook member 23 in a clockwise direction into its withdrawn flap post disengaging position. The pilot then operates valves 55 and 54 to respectively control the degree of opening of the inner and outer flap members 29 and 30 and thereby controls the flow of motive gases through the opening 21. The flow of these diverted gases is then effectively reversed by the arcuate deflector vanes or the like 22 such that a substantial portion of the thrust energy developed by the turbine is neutralized and/or used to develop a reverse thrust which appreciably reduces the speed of flight of the aircraft.

When it is desired to control the effective area of the exhaust nozzle of the power plant and improve its efficiency as the conditions of flight of the aircraft change, the pilot returns the flap member 29 to its closed position and closes valve 52 thereby allowing hook member 23 to reengage post 27 on the flap member 29. He then opens valve 53 which actuates piston 35 against the bias of spring 41 and operates hook member 24 to its withdrawn flap post disengaged position. The pilot then operates valve 55 to adjust and control the effective area of the exhaust nozzle of the power plant. Before each operation the system is placed in a neutral position by allowing the bias springs to return all pistons to a closed position thus exhausting the valves.

It is to be understood that although not shown in the drawing any suitable automatic and integrated control system could be provided for control and operation of the various hook members and flap members without departing from the spirit or scope of the present invention.

Obviously many modifications and variations of the present invention are possible in the light of the above teachings. It is therefore to be understood that within the scope of the appended claims the invention may be practiced otherwise than as specifically described.

What is claimed is:

1. Jet propulsion power plant apparatus comprising a turbine; wall structure aft of the turbine providing a normal motive fluid flow passage defined by a centrally disposed tail cone and a concentric outer casing, said casing having an elongated opening formed therein adjacent its after extremity; means disposed within the opening for directing gases flowing therethrough upwardly and outwardly therefrom; a flap member; means for pivotally mounting the flap member about the leading and trailing edges of the opening; and means for controlling the angular disposition of the flap member about the said leading and trailing edges of said opening.

2. Jet propulsion power plant apparatus comprising a turbine; wall structure aft of the turbine providing a normal motive fluid flow passage defined by a centrally disposed tail cone and a concentric outer casing, said casing having an elongated opening formed therein adjacent its after extremity; a plurality of arcuate deflector vanes disposed within the opening; a flap member; means for pivotally mounting the flap member about the leading and trailing edges of the opening; and means for controlling the angular disposition of the flap member about the said leading and trailing edges of said opening.

3. Jet propulsion power plant apparatus comprising a turbine; wall structure aft of the turbine providing a normal motive fluid flow passage defined by a centrally disposed tail cone and a concentric outer casing, said casing having an elongated opening formed therein adjacent its after extremity; means disposed within the opening for directing gases flowing therethrough upwardly and outwardly therefrom; hook members pivotally secured adjacent the leading and trailing edges of the said opening; a flap member having hook member engageable means disposed along the leading and trailing edges thereof so that said flap member can cover or uncover the opening; means for controlling engagement and disengagement of the hook members with the hook member engageable means and means for moving said flap member when one set of hook engageable means are disengaged from the pivoted hook members.

4. Jet propulsion power plant apparatus comprising a turbine; wall structure aft of the turbine providing a normal motive fluid flow passage defined by a centrally disposed tail cone and a concentric outer casing, said casing having an elongated opening formed therein adjacent its after extremity; a plurality of arcuate deflector vanes disposed within the opening means slideably mounted within said casing for closing said opening; a flap member; means for pivotally mounting the flap member about the leading and trailing edges of the opening; and means for controlling the angular disposition of the flap member about the said leading and trailing edges of said opening.

References Cited in the file of this patent
UNITED STATES PATENTS

| | | |
|---|---|---|
| 497,296 | Barber | May 16, 1893 |
| 2,681,548 | Kappus | June 22, 1954 |